… [19]
United States Patent
Huff

[11] Patent Number: 4,731,180
[45] Date of Patent: Mar. 15, 1988

[54] WATER-SOLIDS SEPARATOR AND WIPER BLADE

[76] Inventor: Karl C. Huff, 1214 W. Glenlake, Chicago, Ill. 60616

[21] Appl. No.: 520,057

[22] Filed: Aug. 3, 1983

[51] Int. Cl.⁴ ............................................. B01D 29/38
[52] U.S. Cl. .................................. 210/298; 210/305; 210/413; 209/387
[58] Field of Search ............... 210/249, 298, 305, 306, 210/327, 332, 407, 408, 413, 414, 334, 107, 386, 396; 55/296, 299; 209/385, 386, 387; 15/246

[56] References Cited

U.S. PATENT DOCUMENTS

| | | | |
|---|---|---|---|
| 1,959,491 | 5/1934 | Moran | 210/413 |
| 2,596,518 | 5/1952 | Bahnson | 210/413 |
| 2,919,806 | 1/1960 | Hock et al. | 210/414 |
| 2,994,434 | 8/1961 | Moseres | 210/413 |
| 3,194,399 | 7/1965 | Harms | 210/413 |
| 3,334,749 | 8/1967 | Ladd | 210/298 |
| 3,768,657 | 10/1973 | Hoag | 210/298 |
| 4,394,272 | 7/1983 | Damerau | 210/298 |
| 4,437,991 | 3/1984 | Tashiro | 210/413 |

Primary Examiner—Richard V. Fisher
Assistant Examiner—Wanda L. Millard
Attorney, Agent, or Firm—Ronald E. Barry

[57] ABSTRACT

A water-solids separator including a casing forming a reservoir and having an inlet and an outlet, a perforated filter screen assembly positioned in said casing between said inlet and said outlet, an overflow weir in front of the outlet to define the depth of water in the reservoir, a baffle plate on the inlet side of said filter screen assembly to direct incoming water toward the filter screen assembly and a conveyor assembly on each side of the filter screen assembly for cleaning the surfaces of the filter screen assembly, each conveyor assembly including a number of wiper blade flights located in positions to move in abutting engagement across the surfaces of the filter screen assembly, each flight including a resilient wiper blade or brush to clean the perforations in the filter screen assembly.

18 Claims, 7 Drawing Figures

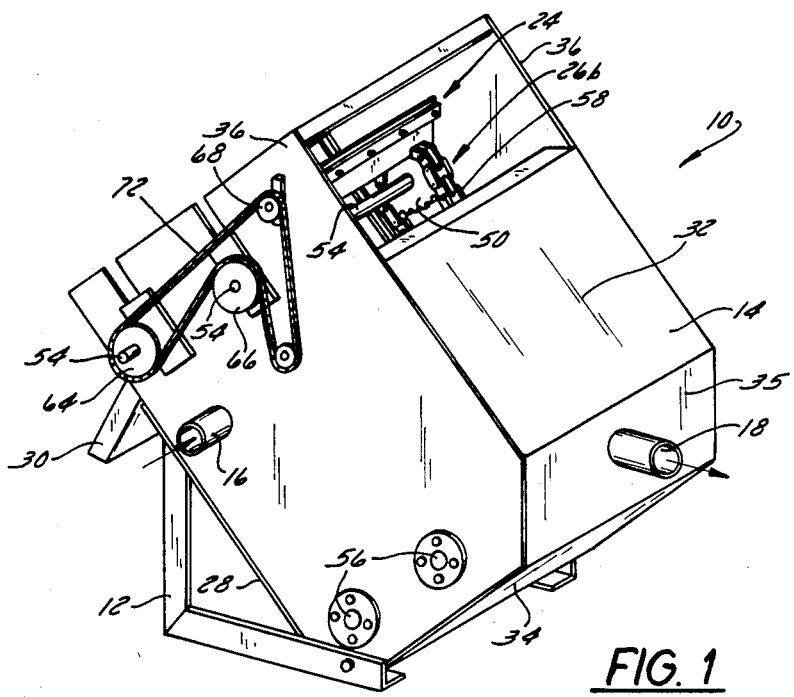
FIG. 1
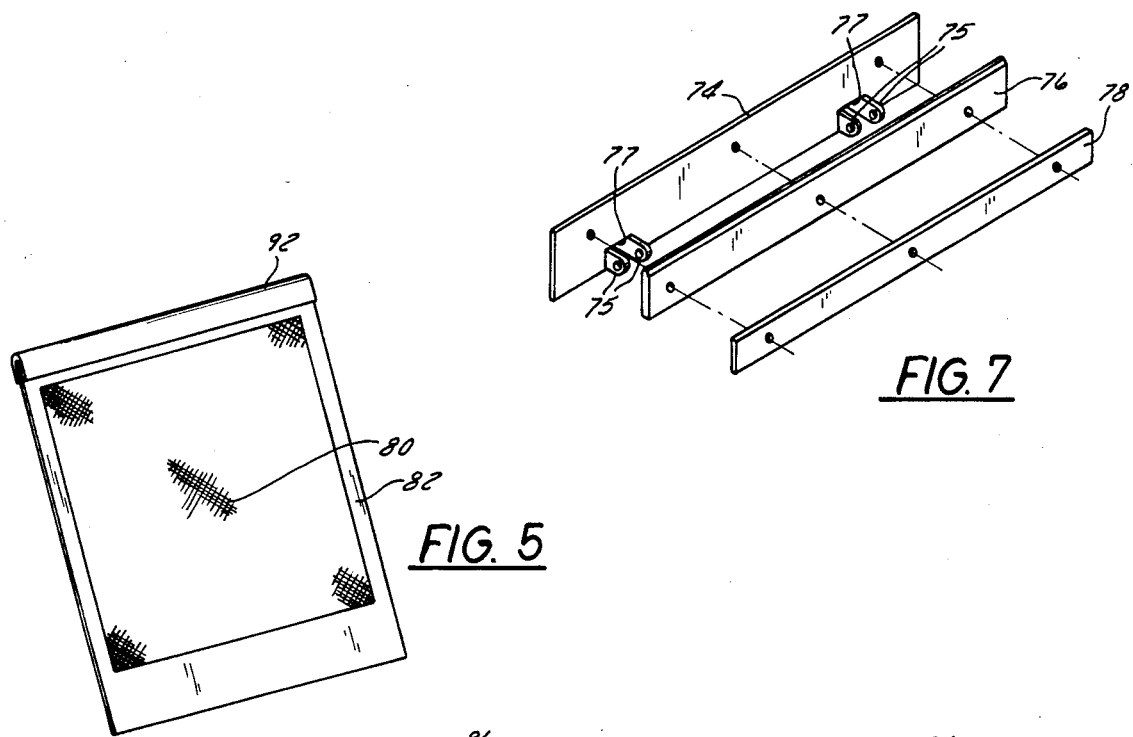
FIG. 5
FIG. 7
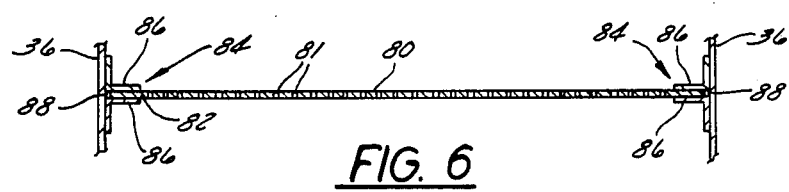
FIG. 6

WATER-SOLIDS SEPARATOR AND WIPER BLADE

BACKGROUND OF THE INVENTION

Industrial water solids separators are designed to process industrial waste water at the primary level for the automatic removal of settled solid wastes and sludges, buoyant debris and surface wastes which are lighter than water. Solid waste and sludges are normally removed from the system by conveyors having flights which carry the sludges from the bottom of the containers to ejector chutes located at levels above the water level of the container. Where floating wastes are contemplated surface conveyors are used in conjunction with a beach plate for removing buoyant materials from the surface of the water. Separate conveyors are commonly used to accomplish these functions. Filters or perforated screens are not normally used at the primary level because of their tendency to become plugged or clogged from the waxes or greases present in these materials. Solids ejectors are used generally for the removal of mill scale, sand, glass, cinders and fly ash mixes, silts, slag, lime sludges, machining chips, quenching scale, grinding swarf, tars, limestone, etc. Buoyant materials commonly removed by conveyor systems are the organic debris, such as waxes, tallow, greases, rubber, floc, plastics, iron graphite, etc. All of these materials have a tendency to cling to filters causing the filters to plug, making them difficult to efficiently perform their functions.

SUMMARY OF THE INVENTION

The water solids separator, according to the present invention, utilizes a combination filter screen and conveyor system to separate solids of all kinds from waste water. A novel automatic screen cleaning system has been developed which makes it possible to use thin film screens in waste water removal. This has been accomplished by utilizing resilient wiper blades or brushes to simultaneously wipe both sides of the thin film screens and to thereby extrude any waxy or greasy materials from the perforations in the thin film screen, thus allowing for the continuous free flow of water through the screen. The same wiper blade or flight used to clean the screen can also be used as the means for removing solids which settle in the bottom of the machine from the water. As even flow of water into the machine is provided by a flow distribution baffle that automatically adjusts to variations in water pressure to maintain an even distribution of the water into the machine. Turbulence on the inlet side of the filter screen has been reduced thus allowing for solids to settle to the bottom at a faster rate than normally contemplated. A simple but effective screen removal arrangement has also been built into the system which makes it possible to remove the filter screen and replace it with a new screen in a very short period of time.

DESCRIPTION OF THE DRAWINGS

FIG. 1 is a perspective view of the water solid separator according the invention.

FIG. 5 is a prospective view of the filter screen.

FIG. 6 is an end view of the filter screen shown positioned in the screen support assembly.

FIG. 7 is an exploded perspective view of one of the wiper blade assemblies.

DESCRIPTION

Figure 2:
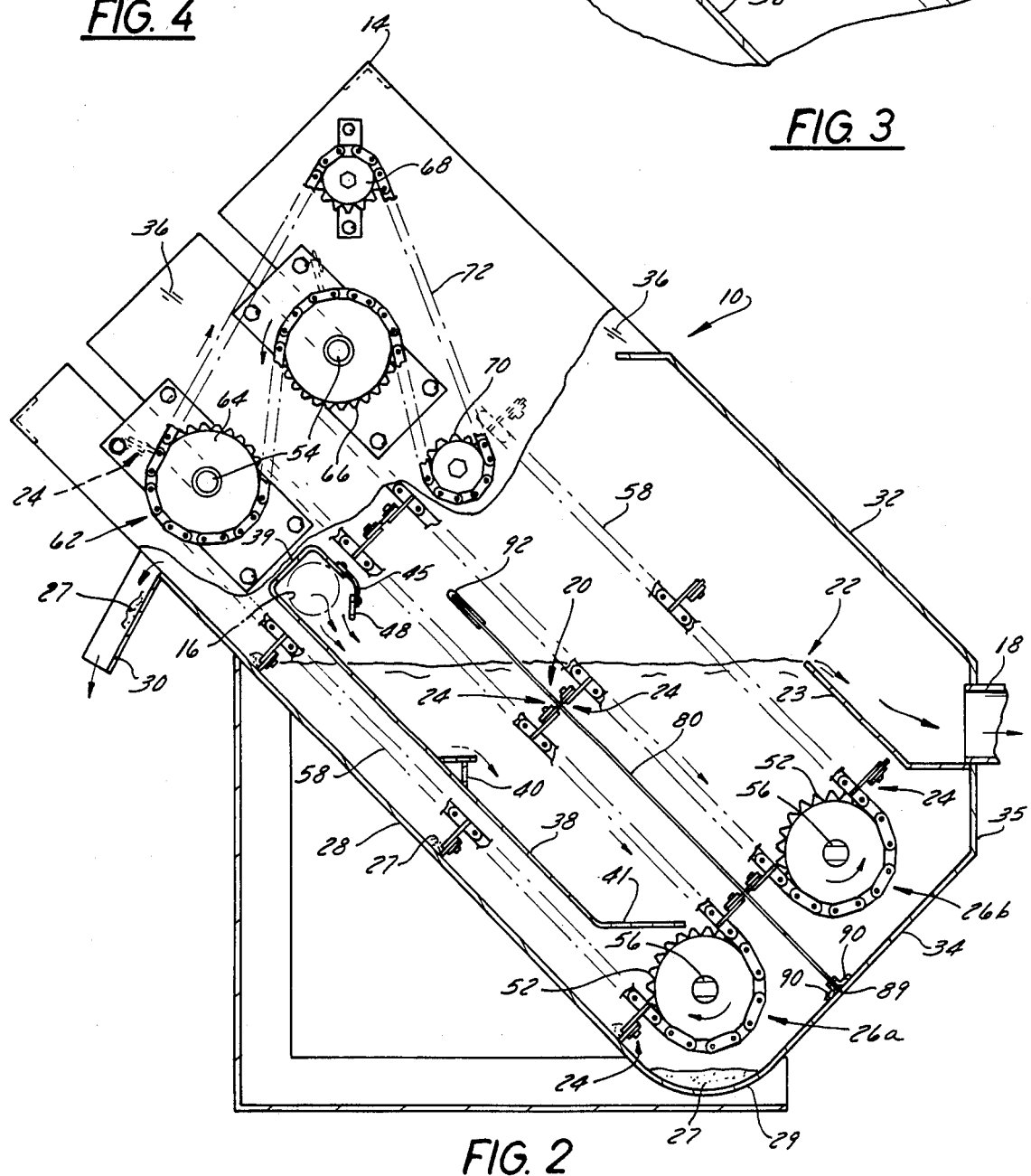
FIG. 2 is a side view partially in section of the water solid separator showing the waste water flow paths.

Referring to FIGS. 1 and 2 of the drawings, the industrial water solids separator 10 is shown mounted on a support 12 in an angularly offset relation to the floor. The separator includes a housing or casing 14 having an inlet 16 and an outlet 18. Waste water entering the housing 14 through the inlet 16 passes through a filter screen assembly 20, over a weir 22 and out through the outlet 18. The screen assembly 20 is cleaned by means of a number of flights or wiper blade assemblies 24 mounted on a pair of conveyor assemblies 26a and 26b located on each side of the screen assembly 20. The conveyor assemblies 26a and 26b are driven continuously to move the flights 24 simultaneously across the surface of the filter screen assembly 20 to remove any materials which have accumulated on the surface of the assembly. Solids 27 which accumulate on the bottom of the housing 14 are removed by means of the conveyor assembly 26a which carries the solids up the inside surface of the casing for discharge through an ejector chute 30.

More particularly, the casing 14 includes a front wall 32, a back wall 28, a bottom wall 34, and a pair of side walls 36 connected to form a settling tank. The back wall 28 and bottom wall 34 are joined by means of a curved section 29 having a diameter conforming to the arc of motion of the outer edge of the flights 24 on the conveyor 26a. The front wall 32 and bottom wall 34 are formed by a front plate 35. The ejector chute 30, provided in the back wall 28, is located at a distance above the water level in the casing which will allow for any water in the sludge 27 to drain from the flights 24 before reaching the discharge chute 30. This distance can be varied depending on the amount of water which is allowed to remain in the discharge sludge. The weir 22 is formed by means of a panel 23 mounted on the inside of the front wall 32 in front of the outlet and terminates at a height at or slightly above the outlet 18. The water level in the casing must rise to the top of weir 23 before passing over the top of the weir 23 for discharge through the outlet 18. The casing thus forms a settling tank for any solids whether floating, suspended or settled on the inlet side of the screen assembly 20. The depth of the water being determined by the height of the weir.

Turbulence within the lower part of the casing is reduced by means of a baffle plate 38 which is mounted on the side wall 36 and extends downward in the casing parallel to the back wall 28 and below the inlet 16. The baffle plate 38 is bent at the upper end to form a hood 39 around three sides of the inlet 16. Means are provided on the baffle plate 38 for deflecting the incoming water toward the screen assembly 21. Such means is in the form of a deflector 40 also provided midway down the surface of the baffle 38 and a deflector 41 formed at the lower end of baffle plate 38. The deflectors 40 and 41 reduce the turbulence of the incoming water by directing the water entering the casing toward the screen assembly 20. The water on the back side of the baffle plate 38 is quiet allowing any solids to settle to the bottom of the casing.

Figure 3:
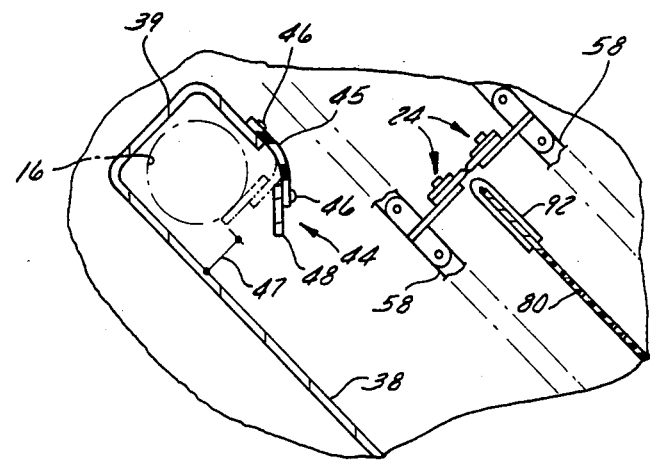
FIG. 3 is an enlarged view of a portion of the separator showing the water inlet deflector and two of the wiper flights about to engage the filter screen.

The water entering from the inlet 16 is distributed evenly across the surface of the baffle plate 38 by means of a resilient baffle assembly 44, FIG. 3. The baffle assembly 44 includes a resilient strip 45 such as rubber secured to the hood 39 by means of fasteners 46 and a plate 48 secured to the strip 45 by fasteners 46. The resilient strip 45 has a permanent curvature of approximately 90° to provide an inherent bias to the plate 48. The water enters the hood 39 under pressure and flows across the back of the baffle plate 38 and out through the space 47 between the edge of the plate 48 and the surface of the baffle plate 38 as seen in FIG. 3. As the flow of water increases, the plate 48 will be gradually forced away from the baffle plate 38 against the bias of the strip 45 increasing the width of the space 47 between the edge of the plate 48 and the baffle plate 38 to accommodate the greater flow of water. The plate 48 thus controls the flow of water providing a smooth flow across the width of the plate 38.

The filter screen assembly 20, as seen in FIGS. 5 and 6, generally includes a screen member 80 having a plurality of perforations 81 mounted in a frame 82. The screen member 80 can be in the form of a perforated plate or a wire screen. The screen member 80 is supported in the casing 14 by means of a pair of guides 84 located on the inside surface of the casing 14. Each of the guides 84 is formed by a pair of angle irons 86 mounted in a spaced relation on the sidewalls 36 to define a groove 88 having a width sufficient to accommodate the frame 82. The bottom of the frame 82 is seated in a groove 89 formed between a pair of angle irons 90 provided on the bottom wall 36. Means in the form of a stiffener 92 can be provided for strengthening the upper edge of the frame 82.

Sludge and suspended solids are removed from the casing 14 by means of the conveyor assembly 26a. In this regard, it should be noted that the baffle plate 38 and deflector 40 are arranged to isolate the lower portion of the casing from turbulence produced by the incoming water. Any solids entering the casing 14 are carried downward in the casing by the motion of the flights 24 on the conveyor assembly 26a. The flights 24 will leave the screen member 80 and pass around the outer periphery of sprockets 52. The outer end of the flights 24 will wipe the inner surface of the casing as the flight moves around the curved section 29 and up the back wall 28. The back wall 28 is set at an angle to the horizontal to act as a beach plate for any settled or bouyant solids being pushed in front of the flights 24. The solids will be discharged from the casing through the ejector chute 30. It should be understood that any materials floating on the water will be carried by the flights 24 down into the water or picked up by the flights leaving the water and discharged through ejector chute 30. The amount of moisture in the discharged solids 27 can be controlled to some extent by locating the discharge chute 30 a greater distance from the surface of the water in the casing.

The surface of the screen member 80 and the perforations 81 are cleaned by means of the flights 24 provided on the conveyor assemblies 26a, 26b. Each conveyor assembly 26a, 26b includes upper and lower sprockets 50, 52, respectively, the upper sprockets 50 being mounted on drive shafts 54 and the lower sprockets 52 being mounted on idler shafts 56. Conveyor chains 58 are mounted on each pair of upper and lower sprockets 50, 52. The wiper blade flights 24 are secured to each of the chains 58 in a parallel spaced relation to each other.

A corresponding number of flights 24 are provided on each chain. The flights 24 on the conveyor assembly 26a and the flights 24 on the conveyor assembly 26b are arranged to be moved into an abutting relation and to bear against each other when passing over the surfaces of the screen member 80.

The conveyor assemblies 26a and 26b are driven at the same speed by means of a drive assembly 62 which includes two drive sprockets 64, 66, two idler sprockets 68, 70, and a chain 72. The drive sprockets 64, 66 are mounted on the ends of drive shafts 54. The drive assembly 62 can be driven by any conventional power source such as an electric motor connected to one of the drive shafts 54. It should be noted that the chain 72 is wrapped around both of the drive sprockets 64, 66 and will therefore provide the same rotary speed to both conveyor assemblies 26a, 26b at all times. This will assure that the flights 24 will come into abutting engagement prior to moving into engagement with the filter screen assembly 20.

A unique method of cleaning the screen member 80 is provided by means of the flights 24 which are made of a resilient material such as rubber or a wire brush. In this regard each of the flights 24 includes a support plate 74, a wiper blade 76 and a support bar 78. The support plate 74 is secured to the chain 58 by means of chain links 75 provided in notches 77 in the plate. The wiper blade 76 can be formed of any resilient or compressable material such as rubber and is secured to the support plate 74 by means of the support bar 78 and a number of screws 79.

Figure 4:
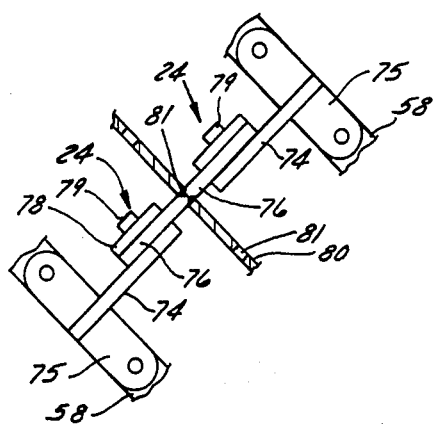
FIG. 4 is a view of a portion of the filter screen showing the action of the wiper blades in cleaning the screen.

Referring to FIG. 4, it will be noted that the screen member 80 as shown includes a plurality of holes or perforations 81. These perforations can be very small but can be cleaned by the present invention. In order to satisfactorily clean the perforations of materials such as grease, wax, tars, etc., the edges of the wiper blades must come into contact in each of the perforations 81. Normally wiping the surface of a screen with a single wiper blade will only clean the surface and not the perforations because the screen tends to bow outward. In accordance with the present invention, the screen member 80 is supported on both sides by the rubber or resilient wiper blade 76 provided in the flights 24. The flights are moved simultaneously down both sides of the screen member 80 while maintaining the abutting relation between the outer edges of the wiper blades. The portion of screen member 80 between the wiper blades 76 will then be held in a rigid relation and wiper blades 76 will enter each perforation or hole 81 in the outer edge of the screen member as the blades 76 are moved over the surfaces of the screen member thus extruding any wax or grease, etc. from the perforations 81. The engagement of the edges of the wiper blades in each perforation will squeeze or extrude any waste material such grease or wax that are normally encountered in filtering industrial waste water from each perforation.

Mounting and replacing of the filter screen assembly 20 has been simplified by utilizing the flights 24 on the conveyor assemblies 26a, 26b to both load and unload the screen member 80. Referring to FIG. 4, the screen member 80 is shown supported by frame 82 between the two conveyor assemblies 26a, 26b. The flights 24 are shown with the wiper blade 76 in abutting relation in a position to slide down the surfaces of the screen member 80. In order to protect the lead edge of the screen, means in the form of the stiffener 92 provided on frame 82 is used to initially separate the resilient wiper blades 76 as they slide down the surfaces of the screen member 80. Whenever a screen member 80 is placed in the casing, the frame 82 is aligned in the grooves 88 formed between the angle irons 86 and pushed inward by hand. The conveyor assemblies 26a and 26b are started and the flights 24 will initially engage the stiffener 92. Since the wiper blades 76 are in abutting relation under a compressive force, they will force the screen member 80 to the bottom of the casing. When the screen member 80 hits the bottom of the casing it will stop and the stiffener 92 will separate the wiper blades 76. When the screen member 80 has to be removed, the conveyor assemblies 26a and 26b are reversed. The compressive force between the wiper blades 76 is sufficient to pull the screen member 80 out of the guides 84.

The embodiments of the invention in which an exclusive property or privilege is claimed, as defined as follows:

1. A water solids separator comprising
    a casing having an inlet and an outlet,
    a filter screen assembly located in said casing between said inlet and said outlet,
    said assembly including a perforated screen member,
    means mounted in said casing for simultaneously wiping the surfaces of both sides of said screen member,
    said wiping means including at least one wiper blade assembly located on each side of said screen member in opposing relation,
    each wiper blade assembly including a resilient wiper blade,
    conveyor means for supporting said wiper blade assemblies for movement across the surface of said screen member with the wiper blades arranged to move into abutting relation in the perforations,
    and drive means operatively connected to drive said conveyor means whereby said resilient wiper blades will squeeze any foreign material from the perforations in the screen.

2. The separator according to claim 1 wherein said wiper blade assemblies are arranged on said conveyor means to move into abutting engagement prior to engaging said screen member.

3. The water solids separator according to claim 1 or 2 wherein said inlet is located above said outlet and said casing includes a wall positioned in front of said outlet to form an overflow weir.

4. The separator according to claim 1 or 2 including baffle means mounted in said casing for deflecting incoming water from said inlet toward said screen member.

5. The separator according to claim 4 including means mounted on said baffle means to distribute the incoming water evenly across the top of said baffle means.

6. The separator according to claim 1 or 2 including a solids discharge chute mounted in said casing on the inlet side of said filter screen, said conveyor means on said inlet side of said filter screen assembly being arranged to move the corresponding wiper blade assembly up the inside surface of the casing to carry settled and buoyant solids upward for discharge through said discharge chute.

7. The separator according to claim 2 wherein said screen member includes
    a frame and stiffener means at one end of said frame for separating said wiper blade assemblies as they move into engagement with the screen member.

8. The separator according to claim 7 wherein said casing includes a screen member guide on each side of said casing for supporting said frame.

9. The separator according to claim 8 wherein said wiper assemblies are pressed together with sufficient force to push the screen member into or out of said guides.

10. A water-solids separator comprising a housing having a back wall,
    an inlet and an outlet,
    means for supporting the housing with the back wall in an angular relation to form a beachplate, said inlet being located above the outlet,
    an overflow weir mounted within said housing above said outlet,
    a filter screen assembly positioned in said housing in a parallel relation to said back wall between said inlet and said weir,
    said screen assembly including a perforated screen member, whereby waste water admitted to said housing passes through said perforations in said screen member assembly and over said weir for discharge through said outlet,
    and wiper blade means located in said housing in a position to wipe both sides of said screen member, said wiper blade means comprising an endless conveyor assembly on each side of said screen assembly, each assembly including a number of resilient wiper blades, said blades on each conveyor assembly being mounted for movement into abutting engagement with a corresponding wiper blade on the other conveyor assembly whereby said wiper blades will come into contact in each of the perforations in the screen assembly.

11. The separator according to claim 10 including baffle means in said housing for deflecting incoming waste water toward said screen member.

12. The separator according to claim 11 including means for controlling the flow of water across the baffle means.

13. The separator according to claim 11 wherein said housing includes
    a solids ejector chute on the inlet side of said filter screen assembly and said conveyor assembly on the corresponding side of said filter screen assembly is arranged to carry solids in the water in said housing up to said ejector chute for discharge.

14. A waste water-solids separator comprising
    a housing having front, back, side and bottom walls forming a settling tank,
    means for supporting said housing with the back wall in an angular relation to the floor,
    an inlet and an outlet to said housing,
    a filter screen member supported in said housing in a parallel relation to said back wall to filter solids from the waste as the water flows from the inlet generally upwardly through the screen member to the outlet,
    said screen member including a plurality of perforations,
    an overflow weir in front of said outlet, and wiper blade conveyor means mounted in said housing to simultaneously wipe both surfaces of said screen member,
    said wiper blade conveyor means including a number of resilient wiper blades arranged to move into abutting engagement in said perforations of the screen member.

15. The separator according to claim 14
including a baffle mounted in the housing in a parallel relation to the back wall and on the inlet side of said screen member to reduce turbulence in the water between the back wall and the baffle by directing incoming water directly into the screen member whereby solids will settle on the bottom of the housing.

16. The separator according to claim 14 wherein said wiper blade means on the inlet side of said screen member passes downwardly across the surface of said screen member and upwardly across the surface of said back wall whereby solids settling on the bottom of said housing will be carried up the back wall for discharge from the housing.

17. The separator according to claim 14, 15 or 16 including a pair of guides on the inside of said sidewall for supporting said screen member in said housing.

18. The separator according to claim 17 wherein said screen member is mounted to move in said guides in the direction of motion of said conveyor means whereby said wiper blades will pull the screen into the housing in one direction of motion and out of the housing in the opposite direction of motion.

* * * * *